United States Patent Office 2,725,374
Patented Nov. 29, 1955

2,725,374

POLYMERIZATION OF ETHYLENE WITH ALKALI METAL AND GROUP VI A METAL OXIDE

Robert A. Mosher, Hammond, Ind., assignor to Standard Oil Company, Chicago, Ill., a corporation of Indiana No Drawing. Application January 14, 1954, Serial No. 404,130

14 Claims. (Cl. 260—94.9)

This invention relates to improvements in the polymerization of ethylene to form polymers of grease-like and/or normally solid character, viz. polymers having a molecular weight of at least about 300. More specifically, this invention relates to an improvement in processes for the polymerization of ethylene to polymers having a molecular weight of at least about 300, said processes being effected by contact of ethylene with an alkali metal and a solid catalytic material containing an oxide of a metal of group 6a (left-hand subgroup of group 6) of the Mendeleef Periodic Table, viz. one or more of the oxides of chromium, molybdenum, tungsten or uranium. The basic process has been described and claimed in application for United States Letters Patent Serial No. 324,610 of Edmund Field and Morris Feller, filed December 6, 1952, now U. S. Patent 2,691,647, which is specifically incorporated by reference herein.

In a continued study of the polymerization process of the aforesaid application, I have discovered that the rate of ethylene polymerization can be substantially increased by effecting said process in the presence of an anhydrous hydrogen halide or a material capable of yielding anhydrous hydrogen halide under the polymerization process conditions, as will be described in detail hereinafter.

One object of my invention is to provide a combination of novel and highly useful catalysts for the preparation of high molecular weight, normally solid polymers from ethylene-containing gas mixtures. Another object is to provide promoters which greatly increase the rate of ethylene polymerization in the presence of alkali metals and solid subgroup 6a metal oxide catalysts. An additional object is to increase the yields of solid ethylene polymers over those heretofore attained by the use of alkali metal-subgroup 6a metal oxide catalysts. These and other objects of my invention will become apparent from the following description and claims.

Briefly, the basic process, of which the present process is an inventive improvement, comprises the conversion of ethylene principally to high molecular weight normally solid polymers by contact with an alkali metal and one or more of the oxides of chromium, molybdenum, tungsten or uranium, for example, a partially reduced molybdenum trioxide extended upon a support. I may employ an activated alumina, titania or zirconia support and also a great variety of other supports for the polymerization of ethylene to form normally solid polymers, e. g., silica supports such as silica gel, kieselguhr, diatomite; silica-alumina, aluminosilicates, such as various clays and bleaching earths; and even adsorptive carbon, which is however not preferred. In a practical process, it is preferable to furnish a difficultly reducible metal oxide support for the group 6a metal oxide catalyst, e. g. gamma-alumina.

The alkali metals are lithium, sodium, potassium, rubidium and cesium, of which I prefer the first three because of their efficacy, economy and relative availability. While I prefer to employ the alkali metals as such, I can employ various alloys or alloy-like compounds thereof, e. g., the various alkali metal silicides. The inventive process is effected at temperatures between about 75° C. and about 325° C., preferably between about 130° C. and 260° C., and pressures between about atmospheric and 15,000 p. s. i. g. or higher, preferably between about 200 and 5000, or about 1000 p. s. i. g. The normally solid materials produced by the catalytic conversion tend to accumulate upon and within the solid catalyst.

It is desirable to supply to the reaction zone a liquid medium which serves both as a reaction medium and a solvent for the solid reaction products. Suitable liquid reaction media for ethylene polymerization include various hydrocarbons, particularly an aromatic hydrocarbon such as benzene, toluene or xylenes. However, the conversion of ethylene-containing gas streams can be effected in the absence of a liquid reaction medium or solvent and the catalyst containing accumulated solid polymeric conversion products can be treated from time to time, within or outside the conversion zone, to effect removal of conversion products therefrom and, if necessary, reactivation or regeneration of the catalyst for further use.

I have discovered that the addition of an anhydrous hydrogen halide into contact with ethylene and the aforesaid catalysts comprising an alkali metal and a subgroup 6 metal oxide exerts an unexpected and pronounced effect upon the rate of ethylene polymerization, sometimes causing the rate of ethylene conversion to be doubled, as will be specifically illustrated in the examples which follow. The anhydrous hydrogen halides which may be employed are hydrogen fluoride, hydrogen chloride, hydrogen bromide and hydrogen iodide. Of these, I prefer to employ hydrogen chloride because of its general availability, economy and the relative ease with which it may be handled in commercial operations. In lieu of the anhydrous hydrogen halide I may employ a material which, under the conditions obtaining in the polymerization reactor, yields substantially anhydrous hydrogen halide, for example, an alkyl halide containing at least 2 carbon atoms per molecule and cycloalkyl halides. Examples of alkyl halides are ethyl bromide, t-butyl chloride, amyl chlorides, propyl fluoride, ethyl fluoride, dodecyl chloride and the like. Examples of suitable cycloalkyl halides are t-methylcyclopentyl chloride, t-methylcyclohexyl bromide, cyclohexyl chloride, cyclohexyl fluoride, t-ethylcyclopentyl iodide and the like.

I have made the further surprising discovery that anhydrous hydrogen halide functions as a co-catalyst or promoter for the alkali metal-subgroup 6a metal oxide catalyst combination only when it is employed within a limited range of ratios relative to the alkali metal. The molar ratio of hydrogen halide to the alkali metal should be at least sufficient to induce a substantial increase in the ethylene conversion rate, usually at least about 0.1 mol of hydrogen halide per gram atom of said alkali metal and not substantially in excess of about 1 mol of anhydrous hydrogen halide per gram atom of said alkali metal. When the amount of hydrogen halide employed in the polymerization reaction substantially exceeds 1 mol per gram atom of alkali metal, the hydrogen halide functions as a poison for the catalyst rather than as a promoter, as will be brought out by specific data hereinafter supplied.

The proportion of alkali metal employed can be varied from about 0.001 to about 2 parts by weight per part by weight of the metal oxide catalyst (total weight of solid catalyst). The promoting activity of the metals increases with increasing atomic weight. The optimum proportions can readily be determined in specific instances, by simple small-scale tests with the specific feed stocks, liquid reaction medium, reaction medium : catalyst ratio, catalyst, temperature, pressure and nature of the product which is desired. Usually sodium is employed in proportions between about 0.01 and about 2 parts by weight or about 1 part by weight per part by weight of molybdenum oxide containing-catalyst and ratios between about 5 and about 3000 volumes or more of liquid medium per part by weight of metal oxide catalyst.

The relative proportions of support to the catalytic metal oxide may be varied throughout a relatively wide range such that each component is present in amounts of at least approximately 1 weight percent. The usual metal oxide-support ratios are in the range of about 1:20 to 1:1, or approximately 1:10. I employ conditioned alumina-metal oxide catalysts composed of gamma-alumina base containing about 1 to 80%, preferably about 5 to 35%, or approximately 10%, of catalytic metal oxide supported thereon.

Gamma-alumina, titania and zirconia supports for my catalysts may be prepared in any known manner and the oxides of molybdenum or other group 6a metal may likewise be incorporated in, or deposited on, the support in any known manner, e. g. as described in copending Serial No. 223,641 (now U. S. Patent 2,692,257) of Alex Zletz and Serial No. 223,643 (now U. S. Patent 2,692,258) of Alan K. Roebuck and Alex Zletz, both filed on April 28, 1951. Excellent results may be obtained with molybdena-alumina, chromia-alumina and tungstia-alumina which can be catalysts of the type employed for effecting hydroforming, the word "hydroforming" being employed to mean processes of the type described in U. S. Letters Patent 2,320,147; 2,388,536; 2,357,332; etc.

The molybdena or other molybdenum-oxygen compound, such as cobalt molybdate, may be incorporated in the catalyst base in any known manner, e. g. by impregnation, coprecipitation, co-gelling, and/or absorption, and the catalyst base and/or finished catalyst may be heat-stabilized in the known manners heretofore employed in the preparation of hydroforming or hydrofining catalysts. Cobalt molybdate catalysts may be prepared as described in U. S. 2,393,288; 2,486,361; etc. Cobalt, calcium, nickel and copper salts of chromic, tungstic and uranic acids may also be employed with or without a support.

Although no partial reducing treatment of the metal oxide catalysts need be effected when they are employed in the presence of alkali metal, a reducing or conditioning treatment is preferred in commercial processing. The conditioning or reducing treatment of the hexavalent group 6a metal oxide is preferably effected with hydrogen although other reducing agents such as carbon monoxide, mixtures of hydrogen and carbon monoxide (water gas, synthesis gas, etc.), sulfur dioxide, hydrogen sulfide, dehydrogenatable hydrocarbons, etc., may be employed. Hydrogen can be employed as a reducing agent at temperatures between about 350° C. and about 850° C., although it is more often employed at temperatures within the range of 450° C. to 650° C. The hydrogen partial pressure in the reduction or conditioning operation may be varied from subatmospheric pressures, for example even 0.1 pound (absolute) to relatively high pressures up to 3000 p. s. i. g., or even more. The simplest reducing operations may be effected with hydrogen at about atmospheric pressure.

The partial reduction of the metal oxide catalyst in which said metal is present in its hexavalent state can be effected in the presence of the alkali promoter, prior to contacting the combination of catalysts with ethylene. An induction period before ethylene polymerization can be eliminated or substantially reduced by pressuring hydrogen into the reactor containing the solvent, ethylene, metal oxide catalyst and alkali metal, e. g. at hydrogen pressures between about 10 and about 900 p. s. i. g., preferably 100–400 p. s. i. g.; under these conditions a small proportion of the ethylene is reduced to ethane.

The partial reduction of the molybdena or other group 6a metal trioxide is carried out to the extent that the average valence state of the catalytic metal in the catalyst lies within the range of about 5.5 to about 2, preferably between about 3.0 and about 5.0.

The catalysts can be employed in various forms and sizes, e. g., as powder, granules, microspheres, broken filter cake, lumps, or shaped pellets. A convenient form in which the catalysts may be employed is as granules of about 20–100 mesh/inch size range.

The charging stock to the present polymerization process preferably comprises essentially ethylene. The ethylene charging stocks may contain hydrogen and hydrocarbons, as in refinery gas streams, for example, methane, ethane, propane, etc. However, it is preferred to employ as pure and concentrated ethylene charging stocks as it is possible to obtain. When the charging stock contains propylene as well as ethylene, both these olefins may contribute to the production of resinous, high molecular weight products.

It is desirable to minimize or avoid the introduction of oxygen, carbon dioxide, water or sulfur compounds into contact with the catalyst.

In general, polymerization can be effected in the present process at temperatures between about 75° C. and about 325° C. Usually polymerization is effected in the present process at temperatures between about 110° C. and about 275° C. for the preferred narrower range of about 220 to about 260° C. The conjoint use of polymerization temperatures between about 230 and about 260° C. and a liquid hydrocarbon reaction medium such as benzene, xylenes, decalin or methyl decalins is highly desirable in producing ethylene polymers having viscosities ($\times 10^5$) ranging on the average from about 10,000 to about 30,000 in continuous operations with relatively long on-stream periods and active catalysts.

It has been found that the present process can be employed for the production of relatively high molecular weight ethylene polymers at relatively low pressures. The process of the present invention can be effected to some extent even at atmospheric pressure. The upper limit of the partial pressure of ethylene in the process is dictated by economic considerations and equipment limitations and may be 10,000 p. s. i. g., 20,000 p. s. i. g., or even more. A generally useful and economically desirable ethylene pressure range is between about 200 and about 500 p. s. i. g., preferably between about 500 and about 1500 p. s. i. g., about 1000 p. s. i. g.

The contact time or space velocity employed in the polymerization process will be selected with reference to the other process variables, catalysts, the specific type of product desired and the extent of ethylene conversion desired in any given run or pass over the catalyst. In general, this variable is readily adjustable to obtain the desired results. In operations in which the ethylene charging stock is caused to flow continuously into and out of contact with the solid catalyst, suitable liquid hourly space velocities are usually between about 0.1 and about 10 volumes, preferably about 0.5 to 5 or about 2 volumes of ethylene solution in a liquid reaction medium, which is usually an aromatic hydrocarbon such as benzene, xylenes or tetralin, or a cycloaliphatic hydrocarbon, such as decalin (decahydronaphthalene). The amount of ethylene in such solution may be in the range of about 2 to 50% by weight, preferably about 2 to about 10 weight per cent or, for example, about 5 to 10 weight percent.

In batch operations, operating periods of between about one-half and about 10 hours, usually between about 1 and about 4 hours, are employed and the reaction autoclave is charged with ethylene as the pressure falls as a result of the ethylene conversion reaction.

The solvent:catalyst weight ratio can be varied in the range of about 5 to about 3000, or even higher for flow systems. The employment of very high solvent:catalyst ratios, which is rendered possible by the presence of an alkali metal in the reaction zone, is very important in obtaining high yields of polymer.

Ethylene can be polymerized in the gas phase and in the absence of a liquid reaction medium by contact with anhydrous hydrogen halide, alkali metal and group 6a metal oxide catalysts. Upon completion of the desired polymerization reaction it is then possible to treat the solid catalyst for the recovery of the solid polymerization products, for example by extraction with suitable solvents. However, in the interests of obtaining increased rates of ethylene conversion and of continuously removing solid conversion products from the catalyst, it is desirable to effect the conversion of ethylene in the presence of suitable liquid reaction media. The liquid reaction medium may also be employed as a means of contacting the ethylene with catalyst by preparing a solution of ethylene in the liquid reaction medium and contacting the resultant solution with the polymerization catalyst. Anhydrous hydrogen halide may be absorbed in the liquid reaction medium under pressure and be introduced as a hydrocarbon solution into the reaction zone. The liquid reaction medium functions as a solvent to remove some of the normally solid product from the catalyst surface.

Various classes of hydrocarbons or their mixtures which are liquid and substantially inert under the polymerization reaction conditions of the present process can be employed. Members of the aromatic hydrocarbon series, particularly the mononuclear aromatic hydrocarbons, viz., benzene, toluene, xylenes, mesitylene and xylene-p-cymene mixtures can be employed. Tetrahydronaphthalene can also be employed. In addition, I may employ such aromatic hydrocarbons as ethylbenzene, isopropylbenzene, n-propylbenzene, sec-butylbenzene, t-butylbenzene, ethyltoluenes, ethylxylenes, hemimellitene, pseudocumene, prehnitene, isodurene, diethylbenzenes, isoamylbenzene and the like. Suitable aromatic hydrocarbon frictions can be obtained by the selective extraction of aromatic naphthas, from hydroforming operations as distillates or bottoms, from cycle stock fractions of cracking operations, etc.

I may also employ certain alkyl naphthalenes which are liquid under the polymerization reaction conditions, for example, 1-methylnaphthalene, 2-isopropylnaphthalene, 1-n-amylnaphthalene and the like, or commercially produced fractions containing these hydrocarbons.

Certain classes of aliphatic hydrocarbons can also be employed as a liquid hydrocarbon reaction medium in the present process. Thus, I may employ various saturated hydrocarbons (alkanes and cycloalkanes) which are liquid under the reaction conditions. Either pure alkanes or cycloalkanes, or commercially available mixtures, freed of catalyst poisons, may be employed. For example, I may employ straight run naphthas or kerosenes containing alkanes and cycloalkanes. Specifically, I may employ liquid or liquefied alkanes such as n-pentane, n-hexane, 2,3-dimethylbutane, n-octane, iso-octane (2,2,4-trimethylpentane), n-decane, n-dodecane, cyclohexane, methylcyclohexane, dimethylcyclopentane, ethylcyclohexane, decalin, methyldecalins, dimethyldecalins and the like.

I may also employ a liquid hydrocarbon reaction medium comprising liquid olefins, e. g., n-hexenes, cyclohexene, 1-octene, hexadecenes and the like.

The normally solid polymerization products which are retained on the catalyst surface or grease-like ethylene polymers may themselves function to some extent as a liquefied hydrocarbon reaction medium, but it is highly desirable to add a viscosity-reducing hydrocarbon, such as those mentioned above, thereto in the reaction zone.

The liquid hydrocarbon reaction medium should be freed of poisons by acid treatment, e. g., with anhydrous p-toluenesulfonic acid, sulfuric acid, or by equivalent treatments, for example with aluminum halides or other Friedel-Crafts catalysts, maleic anhydride, calcium, calcium hydride, sodium or other alkali metals, alkali metal hydrides, lithium aluminum hydride, hydrogen and hydrogenation catalysts (hydrofining), filtration through a column of copper grains or 8th group metal, etc., or by combinations of such treatments.

I have purified C. P. xylenes by refluxing with a mixture of $MoO_3$—$Al_2O_3$ catalyst and $LiAlH_4$ (50 cc. xylene— 1 g. catalyst—0.2 g. $LiAlH_4$) at atmospheric pressure, followed by distillation of the xylenes. Still more effective purification of solvent can be achieved by heating it to about 225–250° C. with either sodium and hydrogen or NaH in a pressure vessel.

Temperature control during the course of the ethylene conversion process can be readily accomplished owing to the presence in the reaction zone of a large liquid mass having relatively high heat capacity. The liquid hydrocarbon reaction medium can be cooled by heat exchange inside or outside the reaction zone. It should be noted, however, that in some instances the solvent may be present as a dense gas phase.

In order specifically to illustrate the present invention without thereby unduly limiting the same, the following examples are presented. In the examples, a 100 ml. stainless steel autoclave was employed, provided with a magnetically-actuated stirrup-type stirrer which was reciprocated through the reaction mixture. In each instance the autoclave was charged with 50 ml. of freshly distilled benzene, which was substantially free of oxygen, water and carbon dioxide. The reactor was also charged, except as otherwise indicated, with 0.5 g. of a commercial hydroforming catalyst which was 8 weight percent $MoO_3$ supported upon gamma-alumina, prereduced before use by treatment with a stream of dry hydrogen at atmospheric pressure for about 16 hours at 450° C. The reactor was in each instance charged with the desired amount of alkali metal. All charging operations were carried out under an inert gas blanket. The reactor contents were heated with stirring to 230° C. and ethylene was then pressured into the reactor to an initial value of about 1000 p. s. i. The hydrogen halide was then introduced and the rate of reaction was measured by noting the ethylene pressure drop during various periods of reaction. In Example 2, in which amyl chloride was employed as a promoter, it was charged with the benzene reaction medium.

*Example 1*

In this operation 6.95 mg. atoms (gram atoms times 1000) of sodium were employed, together with 1.64 millimols of anhydrous hydrogen chloride. It was found that the rate of ethylene absorption during the first hour was 880 p. s. i. and during the first 4 hours it totaled 2050 p. s. i. Physical difficulties were encountered in effecting this reaction because the rate of formation of solid ethylene polymer was so great that at the end of the first 3 hours of reaction it became almost impossible to continue operation of the magnetic stirring mechanism, so that thereafter very poor contacting was obtained. Nevertheless, reaction was continued for a total period of 12 hours to yield 19.8 g. of a tough, normally solid, ethylene polymer per gram of the hydroformer catalyst. The melt viscosity of the polymer (method of Dienes and Klemm, J. Appl. Phys. 17, 458–71 (1946)) was $2.6 \times 10^6$.

In a control run wherein 10.42 mg. atoms of sodium were employed under the same conditions but in the absence of hydrogen chloride, it was found that the ethylene conversion during the first hour of reaction corresponded only to a partial pressure drop of 580 p. s. i. and at the end of 4 hours, to 1050 p. s. i. Stirrer jamming was not encountered until late in the reaction period. Reaction was continued for 16 hours to yield 14.8 g. of tough, normally solid, ethylene polymer per gram of hydroformer catalyst, said polymer having a melt viscosity of $1.3 \times 10^7$.

The following data show that the use of substantially more than one mol of HCl per gram atom of sodium poisoned the catalyst. In this instance 10 millimols of anhydrous HCl were employed with 6.95 mg. atoms of sodium under otherwise constant conditions, compared with the above example. It was found that the ethylene pressure drop during the first hour of reaction was only 220 p. s. i. and at the end of 3.5 hours, was only 820 p. s. i. Reaction was continued for 15.5 hours to yield 9.8 g. of normally solid ethylene polymer per gram of hydroforming catalyst, which is a substantially lower yield than was obtained without the use of HCl. Moreover, the melt viscosity of the polymer obtained in this operation was $8.6 \times 10^4$, which is substantially lower than those obtained in the operations described above; this shows that excess HCl lowered the molecular weight of the ethylene polymer.

*Example 2*

In this operation 0.94 millimol of n-amyl chloride was employed together with 10.4 mg. atoms of sodium. The partial pressure of ethylene during the first hour of reaction dropped 700 p. s. i. and in 3.75 hours, it dropped 1630 p. s. i. Here again, relatively poor contacting was obtained in the reaction zone due to the rapid accumulation of solid ethylene polymer, but contacting could obviously be improved by the employment of properly designed equipment. The reaction yielded 14.8 g. of tough, normally solid ethylene polymer per gram of hydroformer catalyst over a total reaction period of 12 hours. The melt viscosity of the ethylene polymer was $2.1 \times 10^6$.

*Example 3*

The process of Example 1 is repeated but anhydrous hydrogen bromide is substituted in equimolar proportion for the hydrogen chloride employed in Example 1.

*Example 4*

The process of Example 1 is repeated but liquid anhydrous hydrogen fluoride is introduced into the reactor with benzene in an amount equimolar with the amount of hydrogen chloride in Example 1.

*Example 5*

The process of Example 1 is carried out, but 10 weight percent $Cr_2O_3$ supported upon gamma-alumina is employed in the place of the molybdena-alumina catalyst of Example 1. The chromia-alumina catalyst is prereduced before use by the technique employed for the prereduction of the molybdena-alumina catalyst.

*Example 6*

The process of Example 2 is repeated but the metal oxide catalyst is 5 weight percent $WO_3$ supported upon a silica gel, prereduced before use by the technique employed for prereduction of molybdena-gamma-alumina catalysts.

*Example 7*

In this operation I employed 23 milligram atoms of metallic lithium and 1.7 millimols of hydrogen chloride. The ethylene pressure drop in 4 hours was 310 p. s. i. The run was continued for 20 hours and 4.4 grams per gram of catalyst of a normally solid ethylene polymer was obtained.

*Example 8*

In this operation I employed 4.1 milligram atoms of potassium and 1.7 millimols of hydrogen chloride. The rate of ethylene pressure drop during the first hour was 100 p. s. i., increasing to 190 p. s. i. after 3.5 hours. Reaction was continued for 19 hours. The reaction yielded 2.7 grams of normally solid ethylene polymer per gram of catalyst.

It will be appreciated that the above examples are supplied to illustrate specific facets of the invention, which is of broader scope than any of the specific examples.

The process of the present invention can be employed to effect the copolymerization of ethylene with other polymerizable materials and particularly with propylene. Other polymerizable materials include mono-olefinic hydrocarbons such as n-butylenes, isobutylene, t-butylethylene and the like, usually in proportions between about 1 and about 25% by weight, based on the weight of ethylene.

In large scale operations, the continuous process described in connection with the figure of Serial No. 324,610 may be employed, modified by the addition of means for introducing anhydrous hydrogen halide into the reactor and of separating traces of hydrogen halide which may be present in the product reaction mixture by conventional means, such as the addition of ammonia or other alkalies, etc.

I may employ group 5a metal oxide catalysts in lieu of, or in addition to, the group 6a metal oxides in my process, viz., oxides of vanadium, columbium and tantalum, the process remaining otherwise unchanged in all essential regards.

The practice of the process of the present invention leads to ethylene polymers of widely variant molecular weight ranges and attendant physical and mechanical properties, dependent upon the selection of operating conditions. The inventive process is characterized by extreme flexibility both as regards operating conditions and as regards the products producible thereby. Thus the present process can be effected over extremely broad ranges of temperature and pressure. The practice of the present process can lead to grease-like ethylene polymers having an approximate molecular weight range of 300 to 700, wax-like ethylene polymers having an approximate specific viscosity $(\times 10^5)$ between about 1000 and 10,000, and tough, resinous ethylene polymers having an approximate specific viscosity $(\times 10^5)$ of 10,000 or more than 300,000 $[(\eta \text{ relative} - 1) \times 10^5]$.

The polymers produced by the process of this invention can be subjected to such after-treatment as may be desired, to fit them for particular uses or to impart desired properties. Thus, the polymers can be extruded, mechanically milled, filmed or cast, or converted to sponges or latices. Antioxidants, stabilizers, fillers, extenders, plasticizers, pigments, insecticides, fungicides, etc. can be incorporated in the polyethylenes and/or in by-product alkylates or "greases." The polyethylenes may be employed as coating materials, binders, etc. to an even wider extent than polyethylenes made by prior processes.

The polymers produced by the process of the present invention, especially the polymers having high specific viscosities, can be blended with the lower molecular weight polyethylenes to impart stiffness or flexibility or other desired properties thereto. The solid resinous products produced by the process of the present invention can, likewise, be blended in any desired proportions with hydrocarbon oils, waxes such as paraffin or petrolatum waxes, with ester waxes, with high molecular weight polybutylenes, and with other organic materials. Small proportions between about 0.01 and about 1 percent of the various polymers of ethylene produced by the process of the present invention can be dissolved or dispersed in hydrocarbon lubricating oils to increase V. I. and to decrease oil consumption when the compounded oils are employed in motors; larger amounts of polyethylenes may be compounded with oils of various kinds and for various purposes.

The products having a molecular weight of 50,000 or more produced by the present invention, can be employed in small proportions to substantially increase the viscosity of fluent liquid hydrocarbon oils and as gelling agents for such oils.

The polymers produced by the present process can be subjected to chemical modifying treatments, such as halogenation, halogenation followed by dehalogenation, sulfohalogenation, e. g., by treatment with sulfuryl chloride or a mixture of $SO_2$ and $Cl_2$, sulfonation, and other reactions to which hydrocarbons may be subjected.

Having thus described my invention, what I claim is:

1. In a process for the production of an ethylene polymer having a molecular weight greater than about 300 which comprises contacting ethylene with an alkali metal and an oxide of a metal of group 6a of the Mendeleef Periodic Table at a reaction temperature between about 75° C. and about 325° C., the improvement which comprises effecting said contacting in the presence of an anhydrous hydrogen halide in a molar concentration not in excess of said alkali metal but sufficient substantially to increase the rate of ethylene polymerization.

2. In a process for the production of an ethylene polymer having a molecular weight greater than about 300 which comprises contacting ethylene with an alkali metal and an oxide of a metal of group 6a of the Mendeleef Periodic Table at a reaction temperature between about 75° C. and about 325° C., the improvement which comprises effecting said contacting in the presence of an anhydrous hydrogen halide in an amount between about 0.1 and about 1 mol per gram atom of said alkali metal.

3. The process of claim 2 wherein said oxide is partially prereduced before use.

4. The process of claim 3 wherein said hydrogen halide is hydrogen chloride.

5. In a process for the production of an ethylene polymer having a molecular weight greater than about 300 which comprises contacting ethylene with an alkali metal and an oxide of a metal of group 6a of the Mendeleef Periodic Table in the presence of a liquid hydrocarbon reaction medium at a reaction temperature between about 75° C. and about 325° C., the improvement which comprises effecting said contacting in the presence of an anhydrous hydrogen halide in an amount between about 0.1 and about 1 mol per gram atom of said alkali metal.

6. In a process for the production of a normally solid hydrocarbon material which comprises the steps of contacting ethylene and a liquid hydrocarbon reaction medium with an alkali metal and a minor proportion of an oxide of molybdenum supported upon a major proportion of a difficultly reducible metal oxide at a reaction temperature between about 75° C. and about 325° C., the improvement which comprises effecting said contacting in the presence of an anhydrous hydrogen halide in an amount between about 0.1 and about 1 mol per gram atom of said alkali metal.

7. The process of claim 6 wherein said alkali metal is sodium and said hydrogen halide is hydrogen chloride.

8. The process of claim 6 wherein said alkali metal is lithium and said hydrogen halide is hydrogen chloride.

9. The process of claim 6 wherein said alkali metal is potassium and said hydrogen halide is hydrogen chloride.

10. The process of claim 6 wherein said hydrogen halide is generated within the reaction zone by decomposition under the reaction conditions of an alkyl halide having at least two carbon atoms in the molecule.

11. The process of claim 10 wherein said alkyl halide is a chloropentane.

12. In a process for the production of a normally solid hydrocarbon material which comprises the steps of contacting ethylene and a liquid monocyclic aromatic hydrocarbon reaction medium with sodium and a minor proportion of an oxide of molybdenum supported upon a major proportion of an activated alumina, the weight ratio of sodium to oxide catalyst being between about 0.001 and about 2, at a reaction temperature between about 75° C. and about 325° C., the improvement which comprises effecting said contacting in the presence of anhydrous hydrogen chloride in an amount between about 0.01 and about 1 mol per gram atom of said sodium.

13. The process of claim 12 wherein said reaction temperature is between about 220° C. and about 260° C.

14. The process of claim 12 wherein the weight ratio of sodium to oxide catalyst is between about 0.01 and about 1.

No references cited.